United States Patent

Pfisterer

Patent Number: 5,346,039
Date of Patent: Sep. 13, 1994

[54] WHEELCHAIR BRAKE

[75] Inventor: Gerhard Pfisterer, St. Leon-Rot, Fed. Rep. of Germany

[73] Assignee: Otto Bock Orthopaedische Industrie Besitz-und Varwaltungs KG, Duderstadt, Fed. Rep. of Germany

[21] Appl. No.: 117,792

[22] Filed: Sep. 8, 1993

[30] Foreign Application Priority Data

Jun. 29, 1993 [DE] Fed. Rep. of Germany ... 9309593[U]

[51] Int. Cl.$^5$ ................................................. B60T 1/00
[52] U.S. Cl. .................................. 188/2 F; 188/2 D; 188/29; 188/74
[58] Field of Search ................. 188/2 F, 2 D, 69, 74, 188/57, 59, 29, 31, 24.16; 280/250.1, 304.1; 297/DIG. 4

[56] References Cited

U.S. PATENT DOCUMENTS 4,084,663  4/1978  Haley ............................. 280/33.994
4,322,093  3/1982  Otto ................................. 188/2 F Primary Examiner—Robert J. Oberleitner
Assistant Examiner—Clifford T. Bartz
Attorney, Agent, or Firm—Foley & Lardner

[57] ABSTRACT

A wheelchair brake includes a pressing lever having a free end which pivots about a first axis to make braking contact with a wheelchair wheel. The pressing lever is normally urged into a neutral position away from the wheel by an elastic, spring-like member, such as a rubber band or O-ring. A first brake lever for operating the brake by a companion is connected via a Bowden wire to the free end of the pressing lever, so that depression of the first brake lever causes the pressing lever to pivot into braking contact with the wheel. A manually releasable safety catch automatically engages the first braking lever when the lever is depressed, thereby locking the lever in its braking position. A second brake lever is also provided for use by the wheelchair user. The second lever pivots about a second axis causing a pressure part to bear against the same pressing lever causing a braking contact with the wheel. Further pivoting of the second lever also causes the mechanism to lock in a braking position.

11 Claims, 3 Drawing Sheets

WHEELCHAIR BRAKE

BACKGROUND OF THE INVENTION

The present invention relates to a wheelchair brake, and more particularly to a wheelchair brake having a first brake lever for operating the brake by a companion and a second brake lever for operating the same brake by the wheelchair user.

It is generally desirable for a wheelchair to make use of standard wheelchair and spoke designs, and to be light enough so that a companion of the wheelchair-bound user can easily maneuver the chair with the user seated therein. At the same time, it is also desirable that a wheelchair be provided with both a user-operated brake and one which can be operated by a companion of the wheelchair user. When there are two such operating devices for a wheelchair brake present in a wheelchair, it is preferred that operation of one of the devices will not influence, or unlock, the other.

It is known to provide wheelchairs with drum braking systems, but these devices are heavier than desired. Additionally, drum brakes are relatively difficult to adjust and are generally susceptible to recurring deposits of residues in the brake drum. Such devices are also bulky and tend not to be aesthetically pleasing to the user.

SUMMARY OF THE INVENTION

Accordingly, it is an object of the present invention to provide a wheelchair and wheelchair braking device which are structurally improved, lightweight, and simplified with regard to their operation.

It is another object of the present invention to provide a wheelchair and a wheelchair braking device having both a user-operated brake lever and a brake lever which can be operated by a companion.

These objects and others are achieved according to the invention by means of a first brake lever which is connected via a Bowden wire to a pressing lever. An elastic, spring-like member pulls or presses the pressing lever into a neutral position away from one wheel of a wheelchair. Application of the first brake lever, however, pulls against the action the elastic spring-like member and about a first swiveling axis so as to bring the pressing level into a braking contact with a wheelchair wheel. Such contact is preferably made with the tire portion of the wheelchair wheel. At the same time the first brake lever is applied, a manually releasable safety catch is engaged so as to lock the brake lever in its braking position. Additionally, a second brake lever is provided for use by the wheelchair user. This second brake lever acts upon a pressure part to bear against the same pressing lever, which upon further swiveling or rotating of the second brake lever against the action of the elastic, spring-like member is swiveled, or rotated into a braking contact, in which it is held by a locking of the second brake lever.

In a preferred embodiment, the pressure part is a lever which can swivel about a third swiveling axis, and the second brake lever is applied to the pressure part via a pivoting connecting link plate. In this case, a complete and easily assembled brake unit is produced if the second brake lever can swivel about a second swiveling axis which is arranged together with the first and second swiveling axes on a single component fixed to the frame of the wheelchair.

Locking of the second brake lever in its braking position is achieved in another embodiment in which the second brake lever, the pressure part, and the connecting link plate form a system which resembles a toggle lever and whose dead center is situated at the braking end position of the second brake lever.

Yet another embodiment provides a simple backlash compensation of the Bowden wire by means of an interposed compression spring on the free end of the pressing lever through which the Bowden wire is made to act.

An additional embodiment of the present invention is characterized by a simple design which permits simple assembly, and provides for an adjusting unit which is assigned to, or receives the Bowden wire and which can be rotatably plugged with a receptacle into a bore in a perforated plate.

A wheelchair brake according to the present invention thus eliminates the need for a drum brake. With respect to the drive wheels of the wheelchair, it is therefore possible to use standard designs with a standard hub and standard spokes. The wheelchair brake of the present invention is substantially lighter than a drum brake version, it is easier to adjust, and is more reliable, since it does not suffer from the ever recurring deposits of lye residues which are found in a brake drum. Moreover, a wheelchair brake according to the present invention improves the overall visual appearance of the wheelchair.

Finally, a wheelchair brake according to the present invention ensures that the two operating devices for the brake cannot mutually influence one another. Thus, when the brake is set by the companion it cannot be released via the second brake lever. It is equally impossible for the companion to release a brake set by the wheelchair rider via the second brake lever.

Further features of the invention will be explained more fully below with reference to the figures of drawings and a preferred embodiment.

BRIEF DESCRIPTION OF THE DRAWINGS

The preferred embodiment of the present invention will be described in detail with reference to the accompanying figures of drawings, in which.

DETAILED DESCRIPTION OF THE PREFERRED EMBODIMENTS

Figure 1:
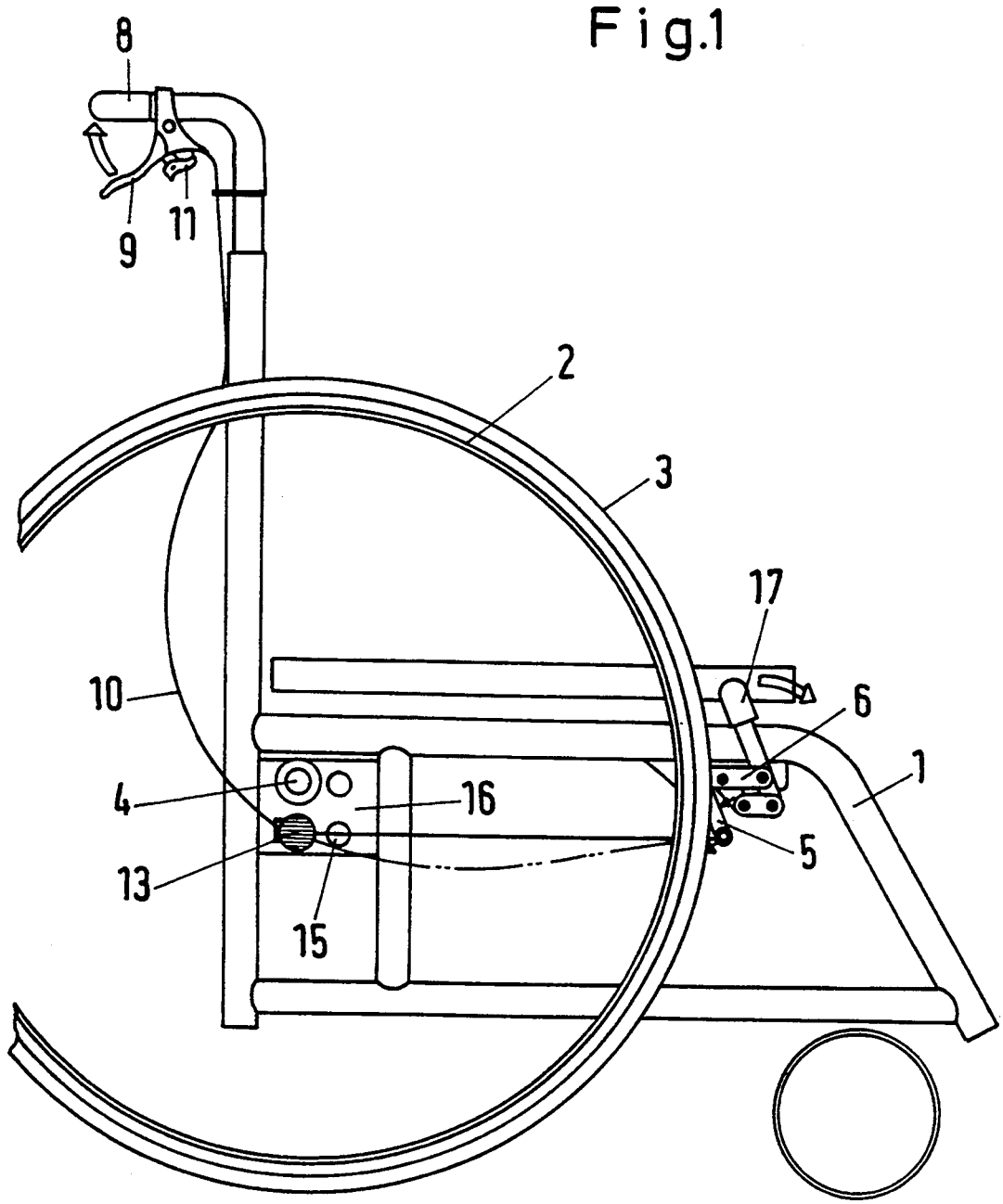
FIG. 1 shows a wheelchair according to the present invention in a side view.

Turning now to FIG. 1, a wheelchair is shown diagrammatically and consists of a frame 1 having standard drive wheels 2, which in turn have plug-in or screw-on axles. The wheels 2 are fitted with tires 3 and have a standard hub 4 and standard spokes (not shown for the sake of clarity).

The braking member is preferably a single-armed pressing lever 5 which is pivoted on a component 6, which is fixed to the frame 1 of the wheelchair and shaped like a link plate such that it can swivel, or pivot about a first swiveling axis 7. In order to brake the wheelchair, this pressing lever 5 is swiveled out of its neutral position, represented in FIG. 1 and shown in FIG. 2 with unbroken lines, to bear against the tire 3 (see broken line in FIG. 2).

So that a companion pushing the wheelchair can operate the brake, there is provided in the region of a handle 8 provided on the frame 1, a first brake lever 9 which is connected via a Bowden wire 10 to the pressing lever 5. By swiveling the first brake lever 9 in the direction of the arrow, the Bowden wire 10 is pulled upwards. As a result, the pressing lever 5 is drawn rearward against the tire 3. Additionally, when the first brake lever 9 is applied, a manually releasable safety catch 11 is engaged which locks this brake lever in its braking position.

Figure 3:
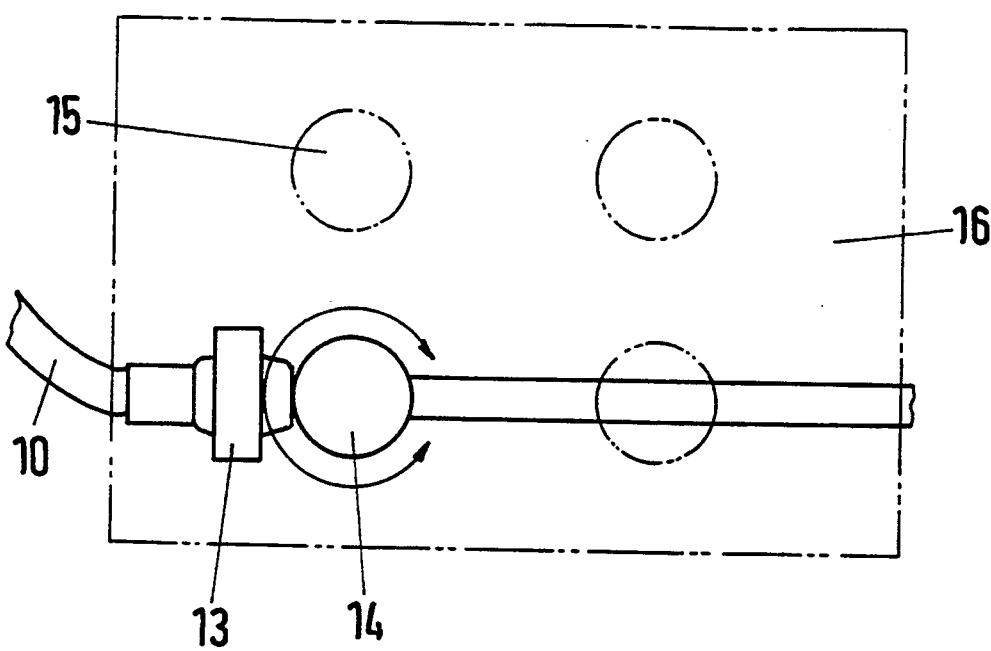
FIG. 3 shows on an enlarged scale a detail of FIG. 1 relating to a Bowden wire adjusting unit of the present invention.
Figure 4:
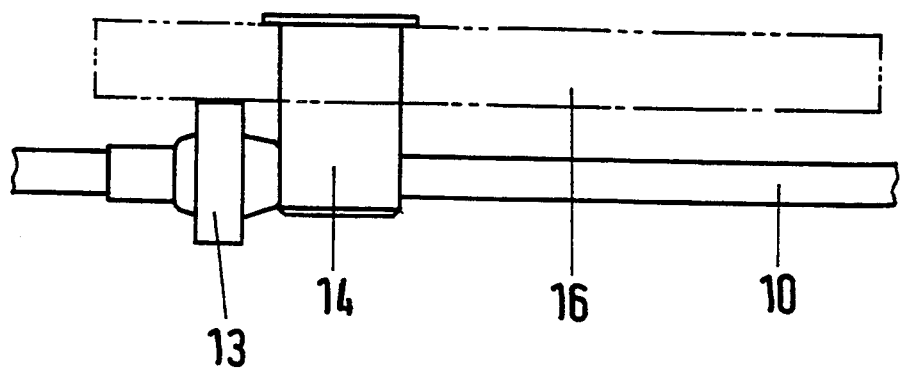
FIG. 4 shows a Bowden wire adjusting unit in accordance with FIG. 3 in a top view.

The Bowden wire 10 acts via an interposed compression spring 12 on the free end of the pressing lever 5. As a result, a backlash of the Bowden wire can easily be compensated. Furthermore, there can be provided along with the Bowden wire 10 an adjusting unit 13 which can optionally be plugged with a rotatable receptacle 14 into a bore 15 in a perforated plate 16 which is mounted on the frame 1. FIGS. 3 and 4, in particular, make clear that the adjusting unit 13 can thus be assembled in any desired position, it being possible to use existing bores in standard perforated plates. The plug-in connection eliminates the screwed-on angle elements otherwise necessary. Since the receptacle 14 is simply plugged into a bore, it can participate in any change of direction of the Bowden wire 10.

Figure 2:
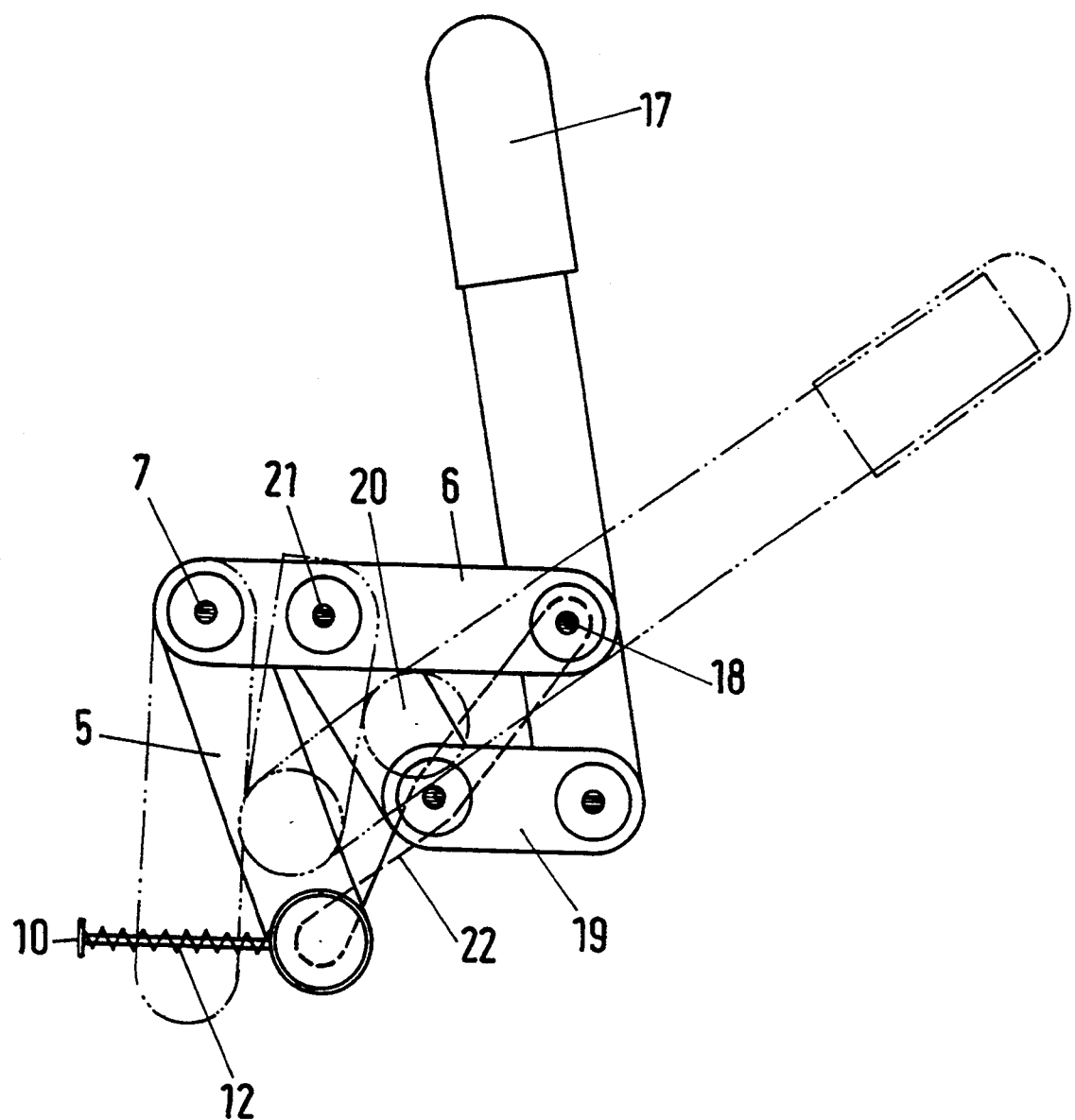
FIG. 2 shows on an enlarged scale a detail of the braking device in accordance with FIG. 1.

The device for operating the brake by the wheelchair user can be more easily understood with reference to FIG. 2. A second brake lever 17 is provided, which is shown in its neutral position away from wheel 2 and tire 3 in FIG. 1, and represented by unbroken lines in FIG. 2. The second brake lever 17 is preferably constructed as a two-armed lever which can be swiveled in the direction of the arrow into a braking position about a second swiveling axis 18. The braking position is represented with broken lines in FIG. 2. First and second swiveling axes 7 & 18 are preferably arranged on component 6 which is fixed to the frame.

The lower arm of the second brake lever 17 is connected in an articulated fashion via a pivoted connecting link plate 19 to a pressure part 20 which is constructed as a single-armed lever which likewise is pivoted via a third swiveling axis 21 to the component 6 fixed to the frame. FIG. 2 shows that swiveling the second brake lever 17 in the direction of the arrow illustrated in FIG. 1 swivels the pressure part 20 in a clockwise direction about a third swiveling axis 21. The lever first comes to bear against the pressing lever 5 and, upon further swiveling, presses this pressing lever 5 to bear against the tire 3 (see the representation in dots and dashes in FIG. 2).

The second brake lever 17, the pressure part 5, and the connecting link plate 19 which couples these two components to one another in an articulated fashion, together form a system which resembles a toggle lever whose dead center is situated in the braking end position of the second brake lever 17. Provided for the purpose of overcoming this dead center is an elastic, spring-like tensile member 22 which acts on the free end of the pressing lever 5 and tends to swivel the pressing lever 5 into its neutral position away from the wheel 2 and tire 3. This tensile member 22 can for example, be an O-ring or an elastic belt with a round cross section. In accordance with the representation in FIG. 2, the tensile member 22 can be guided around the swiveling axis 18 of the second brake lever 17 as well as around the articulated connection between the connecting link plate 19 and pressure part 20. Swiveling of the pressing lever 5 into its braking position is thus performed against the action of the spring-like tensile member 22.

From the foregoing representations and the accompanying Figures, it can be seen that operation of the first brake lever 9 by a companion leads only to swiveling of the pressing lever 5 and engagement of the safety catch 11, while all the remaining parts of the system which resembles a toggle lever remain substantially at rest. When the second brake lever 17 is swiveled by the wheelchair user, all the parts of the braking system move with the exception of the component 6 which is fixed to the frame. However, if the companion has set the brake, the latter cannot be released by the wheelchair user, and vice versa. In this way, the two operating units of the wheelchair brake cannot be mutually influenced.

While the present invention has been described with reference to one or more specific embodiments, it will be appreciated by those skilled in the art to which the invention pertains that certain modifications can be made herein without departing from the spirit of the invention which should be limited only by the scope of the appended claims.

What is claimed is:

1. A wheelchair brake comprising:
    a pressing lever having a free end and an end which is pivoted at a first location;
    an elastic member which contacts the free end of said pressing lever, thereby urging the free end of said pressing lever into a neutral position;
    a Bowden wire having first and second ends, said Bowden wire being attached at said first end to the free end of said lever;
    a first brake lever for operating the brake by a companion, said first brake lever being connected to said second end of said Bowden wire, whereby depression of said first brake lever causes tensioning of said Bowden wire, which in turn causes said pressing lever to pivot from said neutral position into a braking position;
    a manually releasable catch for locking said first brake lever upon depression; and
    a second brake lever for operating the brake by a wheelchair user, said second brake lever comprising a handle portion, a portion which is pivoted at a second location, and a pressure portion which bears against said pressing lever when said second brake lever is pivoted, thereby urging said pressing lever into a braking position, said second brake lever and elastic member being arranged such that further pivoting of said second brake lever against the action of said elastic member causes said second brake lever to lock in a manually releasable manner.

2. A wheelchair brake according to claim 1, wherein said pressure portion is a lever having a first end which is disposed between said handle portion and said pressing lever when said second brake lever is pivoted, and a second end which is pivoted at a third location.

3. A wheelchair brake according to claim 2, further comprising a connecting link plate, said connecting link plate being pivotally disposed between said second brake lever and the first end of said pressure portion.

4. A wheelchair brake according to claim 3, further comprising a component upon which said first, second and third pivoting locations are disposed.

5. A wheelchair brake according to claim 4, wherein the second brake lever, the pressure portion and the connecting link plate form a system which resembles a toggle lever and whose dead center is situated at the braking end position of the second brake lever.

6. A wheelchair brake according to claim 1, wherein the elastic member comprises a rubber band-like member attached to the free end of said pressing lever.

7. A wheelchair brake according to claim 6, wherein said rubber band-like member has a round cross section.

8. A wheelchair brake according to claim 1, further comprising a compression spring disposed about said Bowden wire and in contact with the free end of said pressing lever.

9. A wheelchair brake according to claim 1, further comprising an adjusting unit which receives said Bowden wire, a perforated plate having a plurality of boreholes, and a receptacle which holds said adjusting unit, said receptacle being rotatably disposed within a bore hole of said perforated plate.

10. A wheelchair comprising:
   a frame; and
   a wheelchair brake attached to said frame, said wheelchair brake including:
   a pressing lever having a free end and an end which is pivoted at a first location;
   an elastic member which contacts the free end of said pressing lever, thereby urging the free end of said pressing lever into a neutral position;
   a Bowden wire having first and second ends, said Bowden wire being attached at said first end to the free end of said lever;
   a first brake lever for operating the brake by a companion, said first brake lever being connected to said second end of said Bowden wire, whereby depression of said first brake lever causes tensioning of said Bowden wire, which in turn causes said pressing lever to pivot from said neutral position into a braking position;
   a manually releasable catch for locking said first brake lever upon depression; and a second brake lever for operating the brake by a wheelchair user, said second brake lever comprising a handle portion, a portion which is pivoted at a second location, and a pressure portion which bears against said pressing lever when said second brake lever is pivoted, thereby urging said pressing lever into a braking position, said second brake lever and elastic member being arranged such that further pivoting of said second brake lever against the action of said elastic member causes said second brake lever to lock in a manually releasable manner.

11. A wheelchair brake comprising:
   pressing means, pivotably attached to a wheelchair frame, for engaging one wheel of a wheelchair thereby retarding motion of said wheelchair;
   elastic means for urging said pressing means away from said wheel into a neutral position;
   first means for urging said pressing means into engagement with said wheel, said first means comprising a first brake lever, and a Bowden wire disposed between and attached to said pressing means and said first brake lever such that depression of said brake lever causes a tensioning of said Bowden wire and pivoting of said pressing means;
   a manually releasable catch for locking said first braking lever upon depression;
   second means for urging said pressing means into engagement with said wheel, said second means comprising a second brake lever which is pivotably attached to the wheelchair frame and which includes a handle portion and a pressing portion, said pressing portion being disposed between said handle portion and said pressing means,
   whereby pivoting of said second brake lever causes said pressing portion to bear against said pressing means causing said pressing means to pivot against said wheel, and wherein said handle portion and pressing portion are arranged so that further pivoting of said second brake lever causes said handle portion and pressing portion to lock in a braking position under the influence of said elastic means.

* * * * *